June 6, 1944.  E. GRAF  2,350,752
PLATE FOR SECONDARY OR STORAGE BATTERIES
Filed Dec. 1, 1941
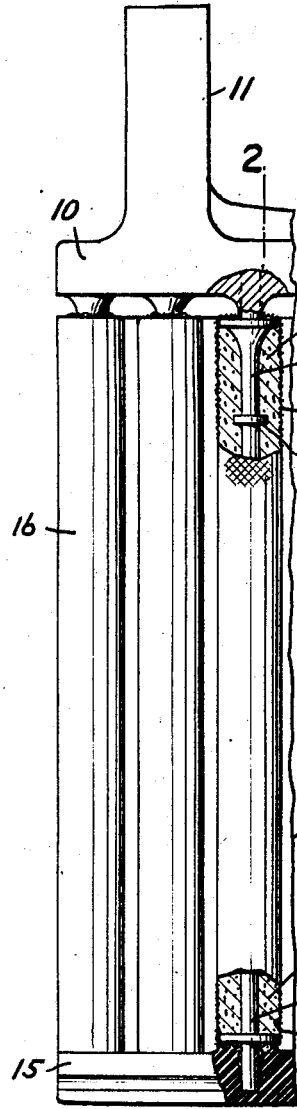
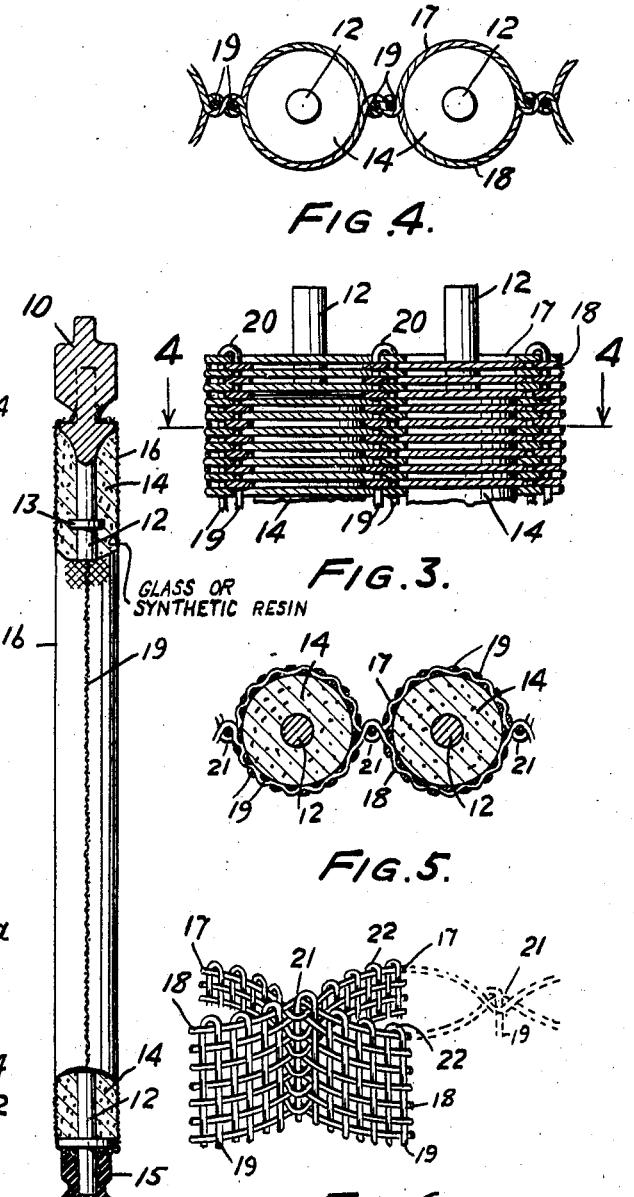
INVENTOR
Ernest Graf
BY
Augustus B. Stoughton
ATTORNEY.
WITNESS:
Robt R Kitchel Patented June 6, 1944

2,350,752

UNITED STATES PATENT OFFICE 2,350,752

PLATE FOR SECONDARY OR STORAGE BATTERIES

Ernest Graf, Philadelphia, Pa., assignor to The Electric Storage Battery Company, Philadelphia, Pa.

Application December 1, 1941, Serial No. 421,088

9 Claims. (Cl. 136—55)

My invention relates to improvements in plates for secondary or storage batteries and has for its object the provision of a new and improved plate which is strong, durable, efficient, and easily, conveniently and inexpensively manufactured.

More particularly, my invention relates to secondary or storage battery plates of the type having spaced pencils of active material mounted on spines attached to top and bottom bars and has for its object the provision of a storage battery plate of this type which shall have long life in use and which can be manufactured at comparatively low cost.

It is a specific object of my invention to provide a new and improved sheath for enclosing the pencils and securing the active material to the individual spines of the aforementioned type of plate.

It is a further specific object of my invention to provide a textile sheath for covering the pencils of active material and to utilize the component threads of the textile sheath as a means for fastening the confronting faces of the latter between the pencils of active material thereby to distribute the stresses and strains over a comparatively large area thus insuring strength and durability.

It is a further specific object of my invention to provide a sheath having a plurality of integral pockets, each of which is suitable for enclosing one pencil of a group of pencils of active material.

Another specific object of my invention is to provide a new and improved method for producing a storage battery plate having a sheath of the aforementioned type.

Further objects and advantages of my invention will appear as the following description proceeds and the features of novelty which characterize my invention will be set forth in the claims appended to and forming a part of this specification.

In accordance with my invention, a storage battery plate or electrode having spaced pencils of active material mounted on spines attached to top and bottom bars is provided with a textile sheath constructed of acid-resisting threads of glass or of a suitable synthetic resin. The textile sheath encloses a group of the pencils of active material and component threads of the confronting faces of the textile sheath are interlaced at spaces between the pencils so as to provide integral pockets each enclosing an individual pencil of the group. By means of this construction the component threads of the fabric lie around and between a plurality of pencils and the stresses at any one point are distributed over a comparatively large area.

For a more complete understanding of my invention, reference should be had to the accompanying drawing in which:

Fig. 1 is an elevational view of a storage battery plate or electrode embodying features of my invention, parts being broken away and sectioned to reveal details thereof;

Fig. 2 is a view taken on the line 2—2 of Fig. 1, parts being broken away and sectioned to show additional details of my invention;

Fig. 3 is a somewhat diagrammatic elevational view of a portion of the plate shown in Fig. 1 drawn to an enlarged scale;

Fig. 4 is a sectional view taken on the line 4—4 of Fig. 3;

Fig. 5 is a view similar to Fig. 4 illustrating a modification of my invention; and Fig. 6 is a perspective view illustrating the sheath shown in Fig. 5 with other parts of the plate or electrode omitted.

Referring to the drawing and more particularly to Figs. 1, 2 and 3, there is illustrated one form of a battery plate or electrode having a top bar 10 provided with a lug 11. Secured to the top bar are a plurality of spines 12. As illustrated, the spines 12 lie in a row and are spaced from each other. Each spine is provided with a plurality of discs 13 for holding the pasted pencils 14 of active material or material to become active in position on the spines. It is to be noted that the top and bottom discs are of greater diameter than the intermediate discs, the purpose of which will be more fully described hereinafter.

Provided at the bottom of the plate is a bottom bar 15 which is preferably made of moldable insulating material, such as methyl methacrylate, and is the type more fully described and claimed in the co-pending application of Curtice C. White, Serial No. 424,510 filed December 26, 1941, and assigned to the assignee of the present invention.

Enclosing the pencils of active material is a textile sheath or retainer 16 constructed of acid resisting threads of glass or a synthetic resin of the vinyl group. As shown in Figs. 3 and 4, the sheath is a fabric having integral pockets provided therein for enclosing each of the individual spines and securing the pencils of active material on the spines. One of the features of my invention is that the component threads of the textile fabric are interlaced at spaced intervals to form the integral pockets enclosing the pasted spines. This may be accomplished in a variety of ways and one advantage of this construction is that it can be rapidly and inexpensively made by a simple weaving or knitting process. Another advantage is that the finished structure possesses strength and durability because the stresses and strains are taken up by the threads of the fabric itself and these threads may have some stretch and elasticity in endwise direction accommodating growth of the active material of some of the pencils in respect to others.

In Figs. 3 and 4 I have shown a specific form of woven fabric contemplated by my invention. In this fabric, the warp threads 17 and 18 successively overlie and underlie adjacent pasted spines and are interwoven at spaced intervals by the weft threads 19. Between the interwoven portions of the warp there is formed a pocket in which a pasted spine lies in the direction of the weft threads. By changing the number of warp threads in the loom, the spacing between the warp threads overlying and underlying the pencils of active material may be adjusted to the desired width for most effectively preventing shedding of the active material.

It is to be noted that the weft threads form a selvage 20 at the upper and lower edges of the fabric. This selvage presents a finished edge which is useful in the assembly and use of the plate thus covered. Furthermore, it is to be noted that the fabric is made longer in the vertical direction than the length of the pencils. This permits the extending portions of the fabric to be secured to the top and bottom bars of the plate as shown in Fig. 1.

In producing the covered pencil construction shown in Figs. 3 and 4, the fabric may first be woven and the pasted spines then inserted in the pockets formed or the pasted spines may be woven directly in the fabric. This latter would be accomplished by inserting the pasted spines between the warp threads, in the manner of the loom shuttle, when the heddles of the loom are raised to separate the warps.

Instead of having only warp threads extending across the pasted pencil, the portion of the fabric overlying and underlying the pasted spines could be woven as shown in the modification illustrated in Figs. 5 and 6. In this modification, the warps 17 and 18 are shown in the form of a double fabric which is interwoven at spaced intervals 21 to form pockets. Here it will be observed only a single weft thread is employed for the interweaving and the warp threads do not pass to the opposite side of the next pasted spine as in Figs. 3 and 4.

The weft threads in this modification also extend longitudinally of the pasted spines so that a selvage 22 is provided at the top and bottom of the spines. If desired, however, the direction of the warp and weft threads could be reversed so that a selvage would be provided at the side edges of the plate. In some instances, this would be more desirable for it would eliminate binding the fabric at the side edges and would give the fabric a more finished appearance.

In manufacturing a plate, the sheath would be woven in long strips and then cut to size. The pasted spines would then be inserted into the open ended tubular pockets provided by the weaving. Since the size of the pocket is selected so as to provide a close fit around the pasted spines, thin wall metal tubes may be employed in mounting the sheath on the spines so as to facilitate assembly and prevent damage to the active material. These metal tubes would be inserted in the pockets of the fabric and the pasted spines then inserted in the tubes. After these operations, the tubes would be withdrawn, leaving the fabric in firm and intimate contact with the active material. The fabric would then be secured at the top by suitable securing means and at the bottom by the bottom bar as shown in Figs. 1 and 2.

As previously stated, the discs or rings 13 intermediate the ends of the spines are of smaller diameter than those at the top and bottom. This construction is provided so that the fabric will not be damaged at these points by contact with the edges of the rings.

In the foregoing description, examples have been given of structures in which the component threads of the textile fabric are interlaced at the spaces between the pencils, but that result can be obtained by other manipulations of the component threads of the fabric as will be apparent. For example, instead of weaving, the fabric could be knitted and the component threads interlaced to form integral pockets. The absence of extraneous fastening means for securing the confronting faces of the textile sheath together between the pencils and the use of component threads of the fabric itself produces a greatly improved union for the reason that growth of the active material or other strains on the sheath is distributed among a number of threads which may shift to some extent and in that way better resist the stress.

While I have shown and described particular embodiments of my invention, it will be understood, of course, that I do not wish to be limited thereto since many modifications may be made and I therefore contemplate by the appended claims to cover any such modifications as come within the true spirit and scope of my invention.

I claim:

1. In a storage battery plate or electrode having pencils of active material mounted on spines attached to the plate or electrode and a textile sheath constructed of acid-resisting threads and enclosing a plurality of said pencils, means for securing the sheath to the plate or electrode and the active material to the individual spines, which comprise component threads of the textile fabric interlaced at the spaces between the pencils, the same threads lying around and between a plurality of pencils.

2. In a storage battery plate or electrode having spaced pencils of active material mounted on spines attached to the plate or electrode and a textile sheath constructed of acid-resisting threads and enclosing a plurality of said pencils, means for securing the sheath to the plate or electrode and the active material to the individual spines, which comprise warp and weft component threads of the fabric arranged in two webs disposed at opposite faces of the plate and interwoven at intervals between the pencils, whereby the same threads lie over and between a plurality of pencils.

3. In the manufacture of storage battery plates or electrodes the method which consists in weaving a sheath of acid-resisting threads in two webs, introducing pencils of active material into succeeding sheds in the weaving, and introducing acid-resisting threads in intermediate sheds.

4. A sheath for a storage battery plate or electrode comprising a bar and a group of spaced pencils of active material mounted on spines connected with the bar and arranged in a row, said sheath comprising warp and weft threads of acid-resisting material interwoven in the form of cloth and having woven therein a series of spaced pockets for the reception of pencils and interwoven at intervals between the pencils.

5. A sheath for a storage battery plate or electrode comprising a bar and a group of spaced pencils of active material mounted on spines connected with the bar and arranged in a row, said sheath comprising warp and weft threads of acid-resisting material, arranged in the general form of a fabric having selvages and a series of spaced open-ended pockets commensurate in size with but slightly longer than the active material of the pencils, said threads being interwoven at intervals between the pockets.

6. A sheath for a storage battery plate or electrode of the type having a bar and a group of spaced pencils of active material connected with the bar and arranged in a row, comprising an acid-resisting textile fabric sheath adapted to cover a group of pencils of active material, the component threads of opposite faces of said fabric sheath being interlaced at spaced intervals to form integral pockets adapted to receive the individual pencils of said group.

7. A sheath for a storage battery plate or electrode of the type having a top bar and a group of spaced pencils of active material connected with the top bar and arranged in a row comprising a unitary fabric of acid-resisting threads adapted to cover a group of pencils, said threads being interwoven at spaced intervals to provide integral pockets for the reception of the individual pencils of said group of pencils.

8. A storage battery plate or electrode comprising top and bottom bars, spaced pencils of active material mounted on spines arranged in a row and connected to said top and bottom bars, a textile sheath constructed of acid-resisting threads enclosing a plurality of pencils, the component threads of said sheath being interlaced at spaced intervals to provide tubular pockets for each of said pencils, a selvage at the top and bottom of said sheath, and means for securing said selvage adjacent said top and bottom bars to secure said sheath on said plate.

9. A storage battery plate or electrode comprising a top bar, a plurality of spines arranged in a row secured to said top bar, pencils of active material mounted on said spines, a woven fabric enclosing a plurality of said spines and interwoven between adjacent spines to provide individual pockets for each spine and its pencil, and a bottom bar connecting the lower ends of said spines and overlying the lower end of said sheath to secure it in position.

ERNEST GRAF.